US008204632B2

(12) United States Patent
Abi-Samra

(10) Patent No.: US 8,204,632 B2
(45) Date of Patent: Jun. 19, 2012

(54) EMERGENCY FREQUENCY LOAD SHEDDING SCHEME

(75) Inventor: Nicholas C. Abi-Samra, Carlsbad, CA (US)

(73) Assignee: Electric Power Research Institute, Inc., Charlotte, NC (US)

( * ) Notice: Subject to any disclaimer, the term of this patent is extended or adjusted under 35 U.S.C. 154(b) by 765 days.

(21) Appl. No.: 12/131,986

(22) Filed: Jun. 3, 2008

(65) Prior Publication Data

US 2009/0299540 A1 Dec. 3, 2009

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*H02J 3/14* (2006.01)
*G01R 23/00* (2006.01)

(52) U.S. Cl. ........ 700/295; 700/286; 700/292; 700/297; 700/298; 307/31; 307/32; 307/34; 307/41; 307/38; 307/39; 702/75

(58) Field of Classification Search .................. 700/295, 700/286; 307/34, 32, 38–39; 702/75
See application file for complete search history.

(56) References Cited

U.S. PATENT DOCUMENTS

| | | | | |
|---|---|---|---|---|
| 7,355,301 B2 * | 4/2008 | Ockert et al. | ................... | 307/29 |
| 2002/0123849 A1 * | 9/2002 | Quaintance et al. | ............ | 702/60 |
| 2004/0190211 A1 * | 9/2004 | Ockert et al. | ................... | 361/92 |
| 2007/0129851 A1 * | 6/2007 | Rossi et al. | .................... | 700/295 |
| 2007/0150114 A1 * | 6/2007 | Gardner et al. | ............... | 700/286 |
| 2007/0222295 A1 * | 9/2007 | Wareham et al. | ............... | 307/32 |
| 2008/0114811 A1 * | 5/2008 | Murdoch | ................... | 707/104.1 |
| 2009/0063228 A1 * | 3/2009 | Forbes, Jr. | ......................... | 705/7 |
| 2010/0072817 A1 * | 3/2010 | Hirst | .............................. | 307/31 |
| 2010/0312414 A1 * | 12/2010 | Kumar | .......................... | 700/295 |

OTHER PUBLICATIONS

Juhwan Jung, "Adaptation in Load Shedding Under Vulnerable Operating Conditions", IEEE Transactions on Power Systems, Nov. 2002, pp. 1199-1205, vol. 17, No. 4.
B. Delfino, "Implementation and Comparison of Different Under Frequency Load Shedding Schemes", IEEE, 2001, pp. 307-312.
Tomaz Tomsic, "Revision of the Underfrequency Load-Shedding Scheme of the Slovenian Power System", Science Direct, Jun. 9, 2006, pp. 494-500.

\* cited by examiner

*Primary Examiner* — Albert Decady
*Assistant Examiner* — Jason Lin
(74) *Attorney, Agent, or Firm* — Trego, Hines & Ladenheim, PLLC

(57) ABSTRACT

A load shedding system and method for controlling imbalances in a power system includes a signal generator adapted to generate a signal representative of a local system, and a modifying circuit adapted to adjust set frequencies. The system also includes a processing circuit adapted to process data received from the signal generator and modifying circuit and set load shedding priorities for the local system based on the processed data.

7 Claims, 7 Drawing Sheets

EMERGENCY FREQUENCY LOAD SHEDDING SCHEME

BACKGROUND OF THE INVENTION

The present invention relates generally to a system and method for controlling imbalances between load and supply in power systems, and more particularly to a load shedding system and method for controlling imbalances in a power system.

In power systems of today, it is essential that a balance between the amount of power being used ("load") and the amount of power being supplied ("supply") be maintained to provide a secure and reliable power system, thereby preventing blackouts and power interruptions. Every imbalance between the supply and load causes a deviation of the frequency. More importantly, if the load exceeds the supply and the deficit is not counteracted, the deficit in supply can lead to system interruptions and even blackouts.

One way to control these imbalances is to use load shedding. Load shedding (i.e., opening a circuit breaker to reduce the load) has been used to mitigate imbalances between supply and load since the infancy of power systems, and has basically remained unchanged over the last 100 years. During the same period, the logic used to shed the load has also only changed slightly. Unfortunately, the power systems, expectations of the users, and their loads have changed drastically, thereby necessitating better ways to handle these imbalances.

Currently, there are basically two kinds of under frequency load shedding schemes: the first is based on pre-determined frequencies encountered during a frequency decline, and the second is based on the rate of decline of the frequency (i.e., first derivative of frequency with respect to time). Both schemes use different time delays (from zero delay to several seconds, in some cases).

The first scheme drops the load based on predefined frequencies, f1, f2, f3, . . . fn in the hope that the dropped load would be enough to reverse the frequency decline by narrowing the gap between the supply and the connected load. The predefined set points are based on previous studies, and they do not consider the actual state of the system when the disturbance occurs or any dynamic system conditions ensuing from the disturbance. Though this scheme is relatively good when there is a smaller disturbance coupled with a long time to respond, it is unable to differentiate between some "normal" system oscillations and actual system disturbances. Hence, it may not shed enough load to arrest a frequency decline associated with real disturbances. This could cause the disturbance to cascade and result in the system actually collapsing because the appropriate action (shed enough load) was not taken at the right time.

The second scheme for shedding load is based on the rate of change (first derivative) of the frequency decline (combined often with predefined frequencies). This scheme solves some of the concerns with the first scheme above by providing a means for a faster response to disturbances and a better method for differentiating disturbances from "normal" system oscillations. The rate of change of the frequency (df/dt) is used at some or all of the predefined frequencies.

Unfortunately, the last blackouts, including the 2003 North East Blackout, have shown that the above existing load shedding schemes are not sufficient to arrest frequency declines and can not save power systems from large disturbances. Accordingly, there is a need for a load shedding scheme that can sufficiently arrest frequency declines that result from large disturbances.

BRIEF SUMMARY OF THE INVENTION

These and other shortcomings of the prior art are addressed by the present invention, which provides an emergency frequency load shedding sheme that preempts a frequency decline by shedding load based on the severity of a disturbance.

According to one aspect of the present invention, a load shedding system includes a signal generator adapted to generate a signal representative of a local system; a modifying circuit adapted to adjust set frequencies; and a processing circuit adapted to process data received from the signal generator and modifying circuit and set load shedding priorities for the local system based on the processed data.

According to one aspect of the present invention, a method of pre-empting a frequency decline includes the steps of continuously monitoring voltage or current of a local system over a set time interval; estimating a rate of change of frequency with time from voltage and current measurements taken during the time interval; and using the rate of change of frequency with time to determine a frequency load shedding point.

According to one aspect of the present invention, a method of pre-empting a frequency decline includes the steps of continuously monitoring voltage and current of a feeder; estimating a rate of change of frequency with time from voltage and current measurements taken during a set time interval; estimating a rate of change of power with frequency; using the rate of change of frequency to determine a frequency load shedding point; and using the rate of change of power with frequency to set load shedding priorities.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
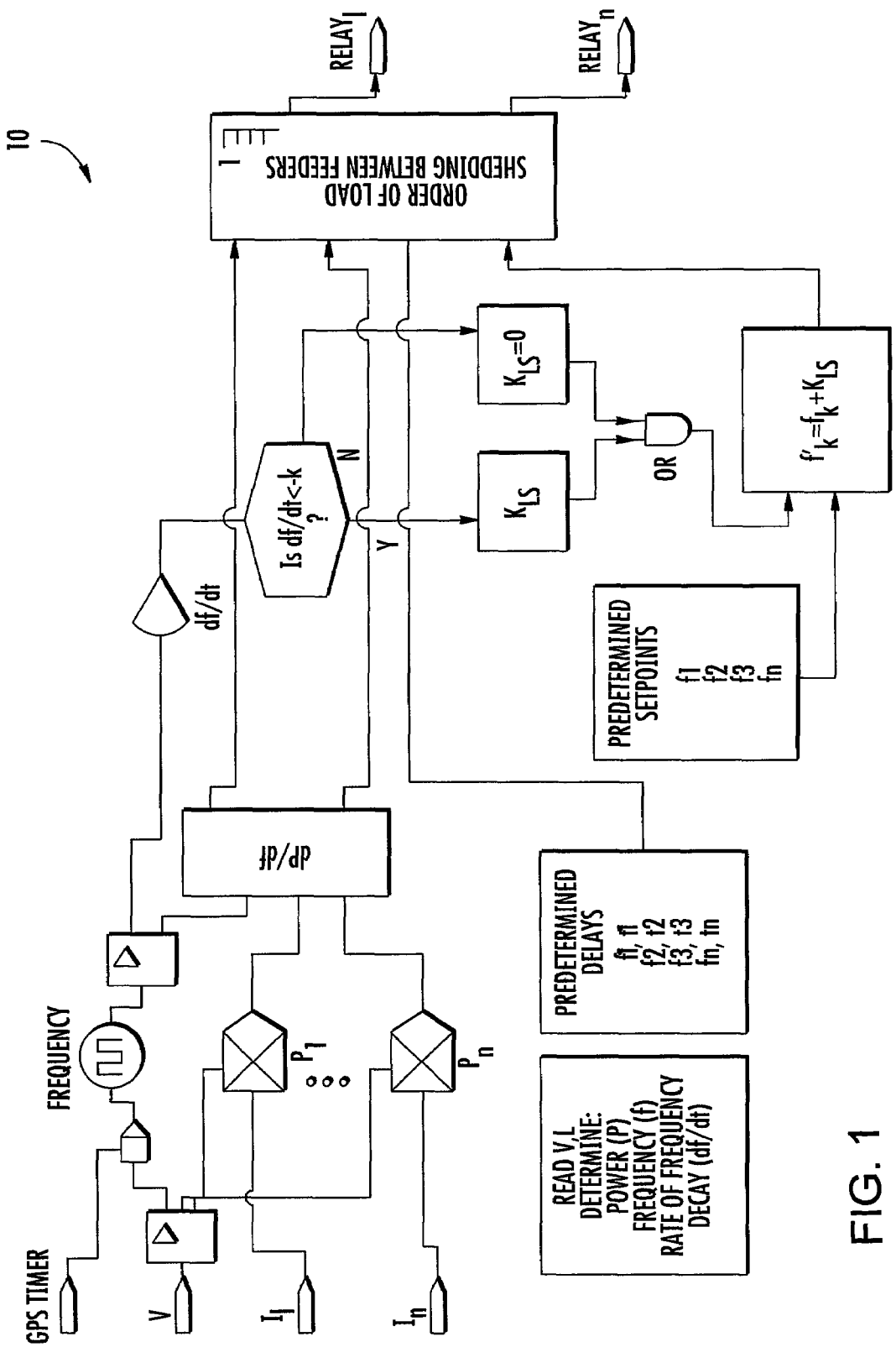
FIG. 1 shows a load shedding system according to an embodiment of the invention.

Referring to the drawings, an exemplary emergency frequency load shedding scheme or system according to the present invention is illustrated in FIG. 1 and shown generally at reference numeral 10. The system 10 is an adaptive emergency load shedding system which can differentiate between disturbances and normal frequency oscillations. Unlike the prior art, the system may preempt a frequency decline by shedding load based on the severity of a disturbance. This allows the system to shed a load earlier than what the predetermined frequencies dictate.

Figure 2:
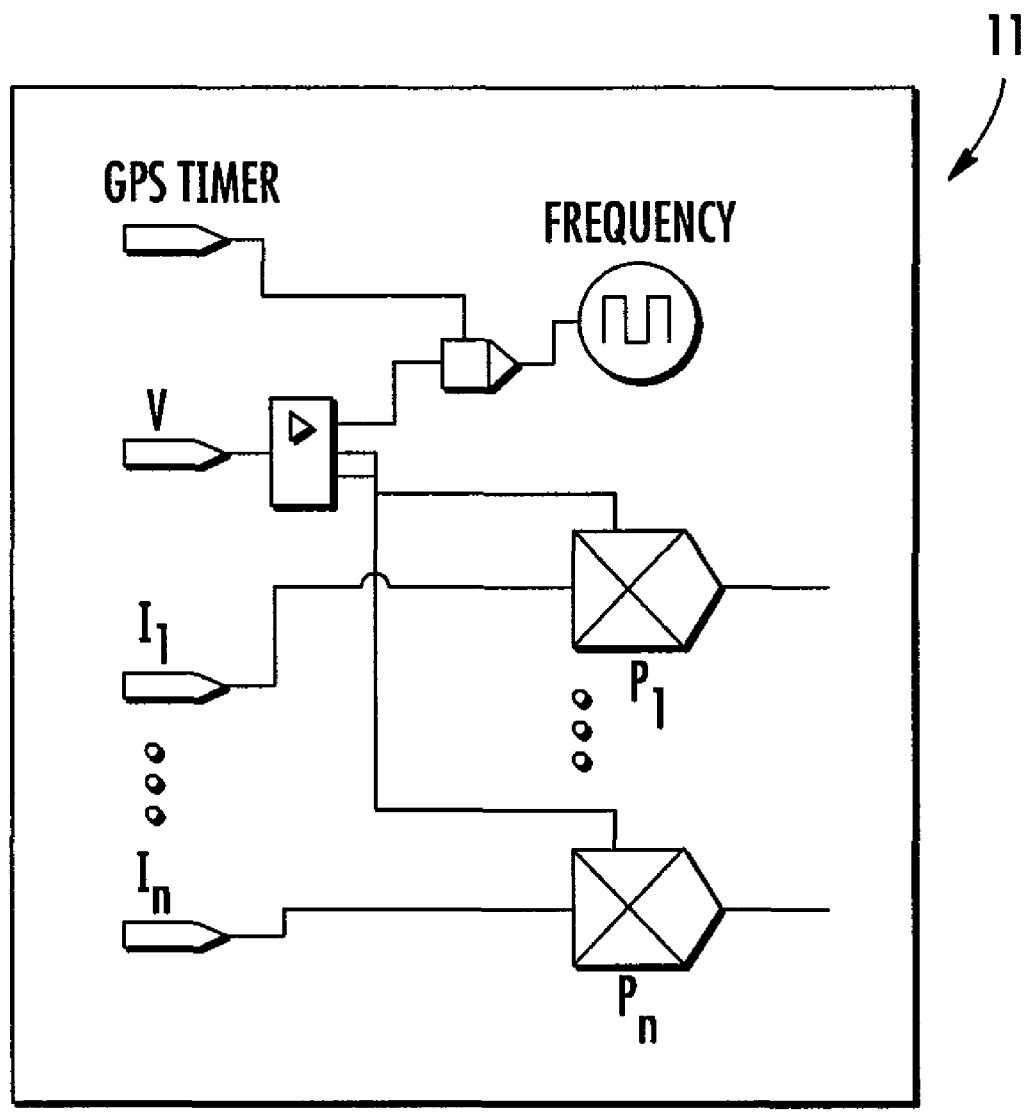
FIG. 2 shows input circuitry of the system of FIG. 1.

Referring to FIG. 2, the system 10 uses a signal generator 11 to provide a localized reading of a local power system frequency and power (P) carried by different feeders. Further, the signal generator 11 generates a signal equal to the frequency of the local system frequency and the power carried by the different feeders to which the system 10 acts on.

Figure 3:
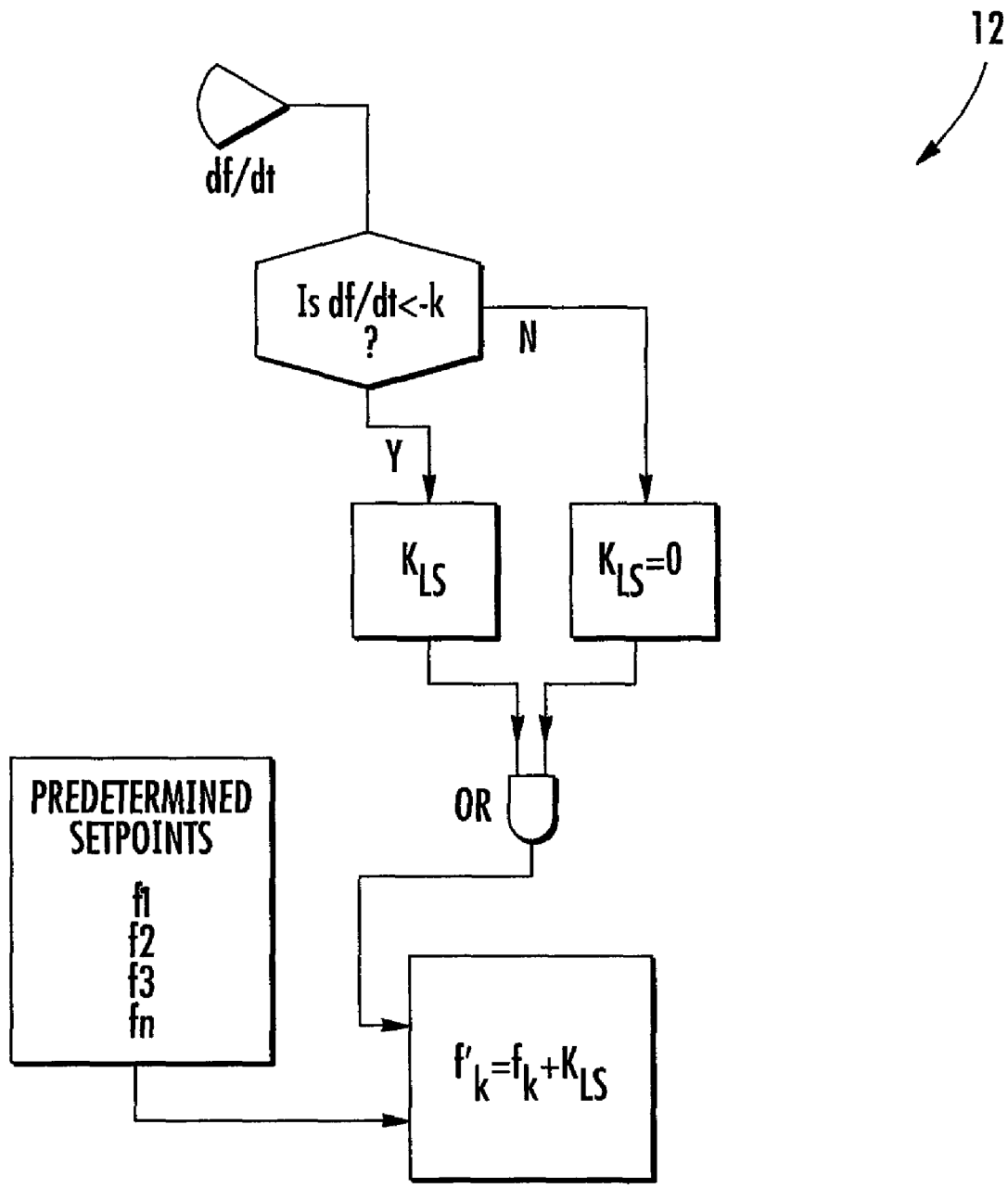
FIG. 3 shows a modifying circuit of the system of FIG. 1.

As shown in FIG. 3, a modifying circuit 12 is used to adjust predefined set frequencies (f1, f2, ... fn) based on the severity of a disturbance. As illustrated, the circuit 12 uses the instantaneous rate of frequency declines ("df/dt") to change the next trip frequency. For example, if df/dt is negative and the magnitude is larger than a user definable constant ("k"), which can be either determined or applied on a local basis or system wide, then the next pre-defined tripping frequency will be increased by a load shedding constant ("$K_{LS}$"), i.e., the load shedding will take place at a slightly higher frequency than the original corresponding set point. $K_{LS}$ may be based on engineering judgment or on the results of studies or simulations of the system to which the system 10 is applied, but may be in the range of 0.1 to 0.3 Hz. It is expected that different power systems will have slightly different k's. For example, for large systems which are spread out over large geographic areas or where generating plants are concentrated in a certain area, applying slightly different K's at different locations could further enhance the system due to further differentiation of needed responses, and the ability to tailor the response of the grid more closely to what is needed to resolve the mismatch between generation and load.

As shown, if the rate of frequency, df/dt is greater than or equal to -k, then $K_{LS}$ is set to zero and, hence, the load shedding will take place at the predetermined scheduled frequencies without any correction applied to them. However, if df/dt is smaller than -k (i.e., more negative), then $K_{LS}$, will be non zero and the load shedding will take place at an earlier value of frequency than the predetermined scheduled frequency.

Figure 4:
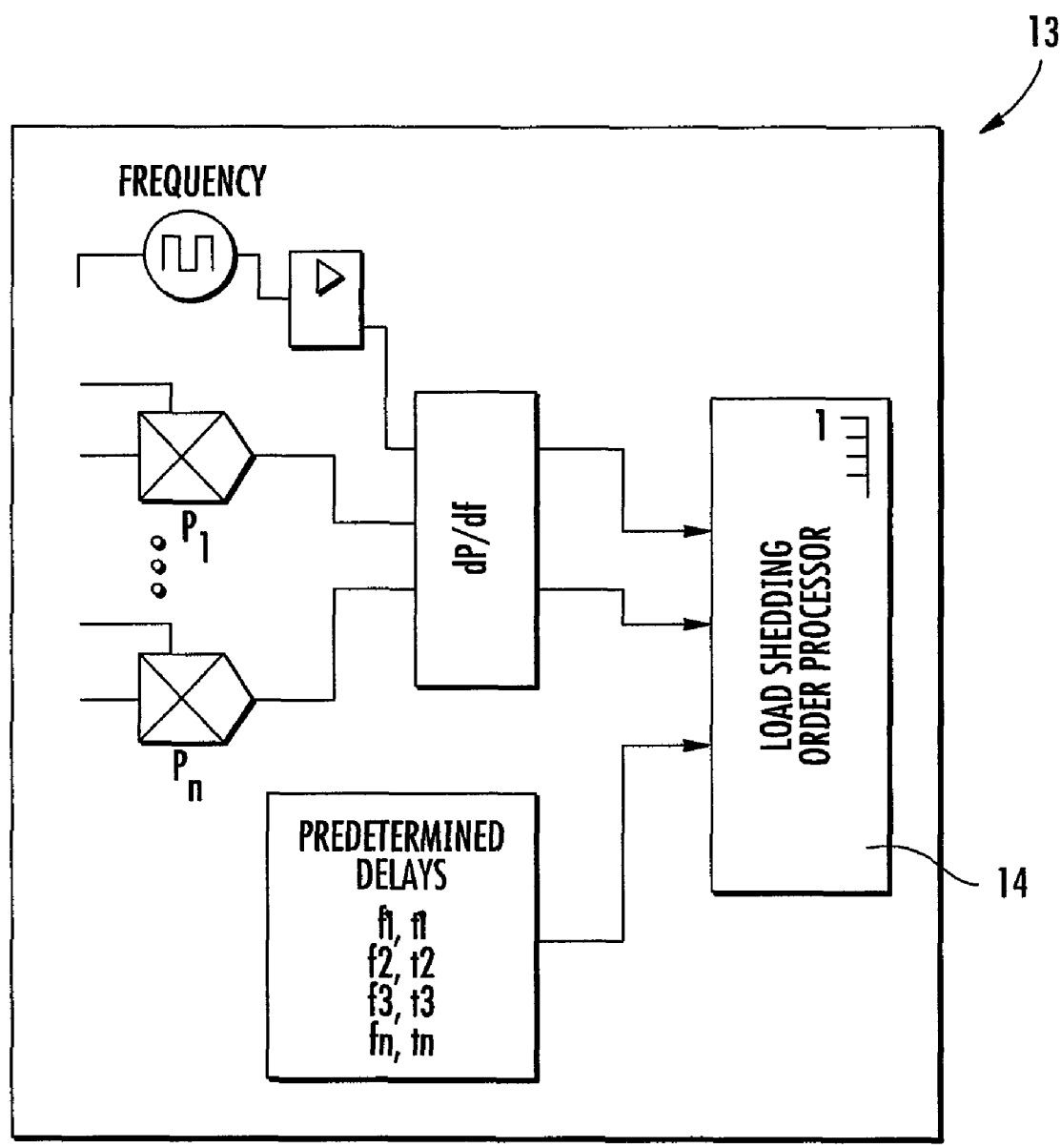
FIG. 4 shows a logic circuit of the system of FIG. 1.
Figure 5:
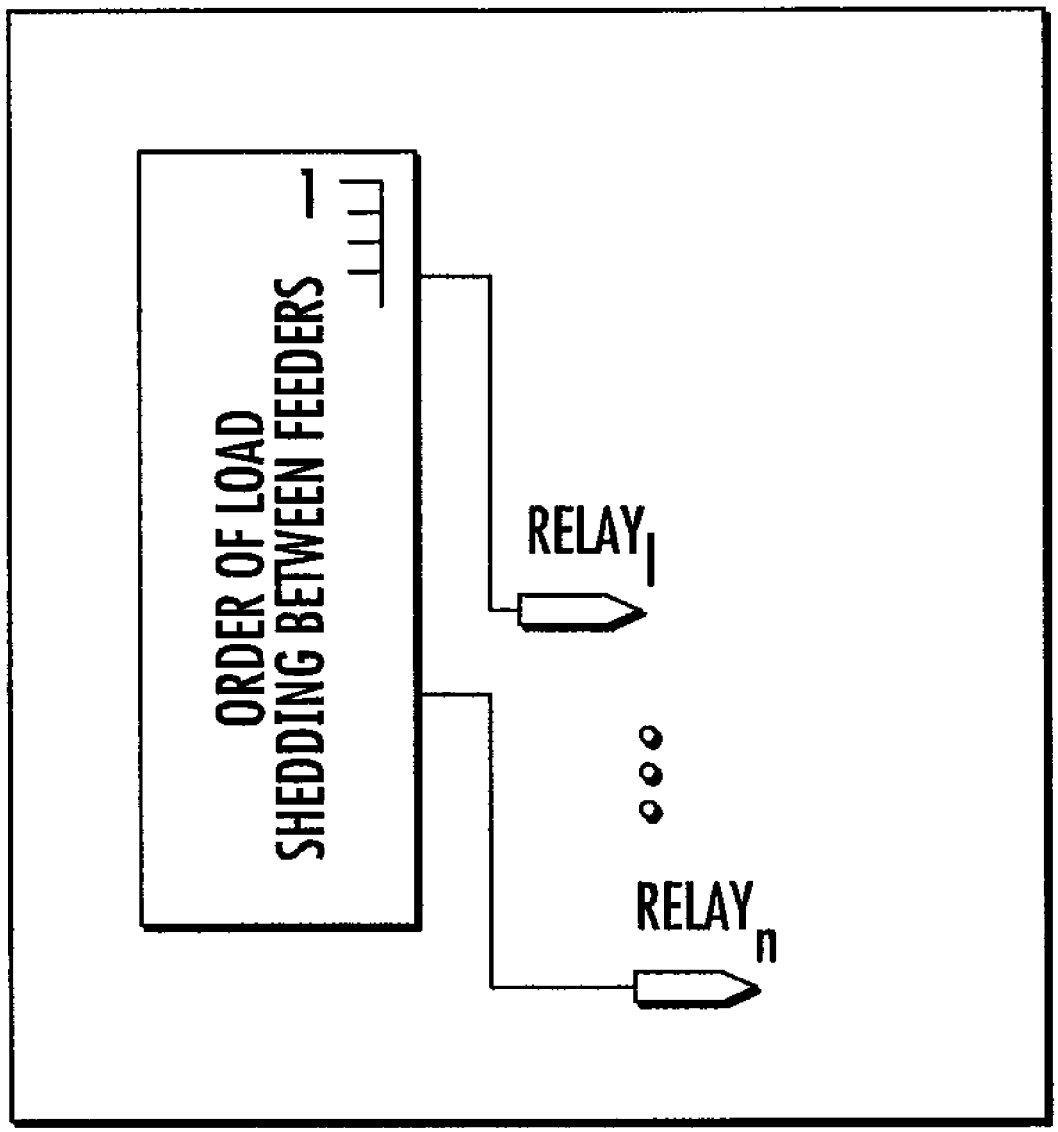
FIG. 5 shows an individual relay of the system of FIG. 1.

Referring to FIGS. 4 and 5, a processing circuit 13 processes data received from the signal generator 11 and the modifying circuit 12 and compares the data to predetermined frequencies ($f_1$, $t_1$ ... $f_n$, $t_n$). It also calculates the rate of change of power with frequency ("$dP_i/d_f$") generated by the signal generator 11. Once the data is analyzed by a load shedding processor 14, priorities are set for feeder tripping based on their frequency characteristics. Thus, processor 14 prioritizes the order of shedding between feeders in real time based on the type of load they carry. Dropping loads with less frequency dependency is more beneficial than dropping loads with more frequency dependence.

Figure 6:
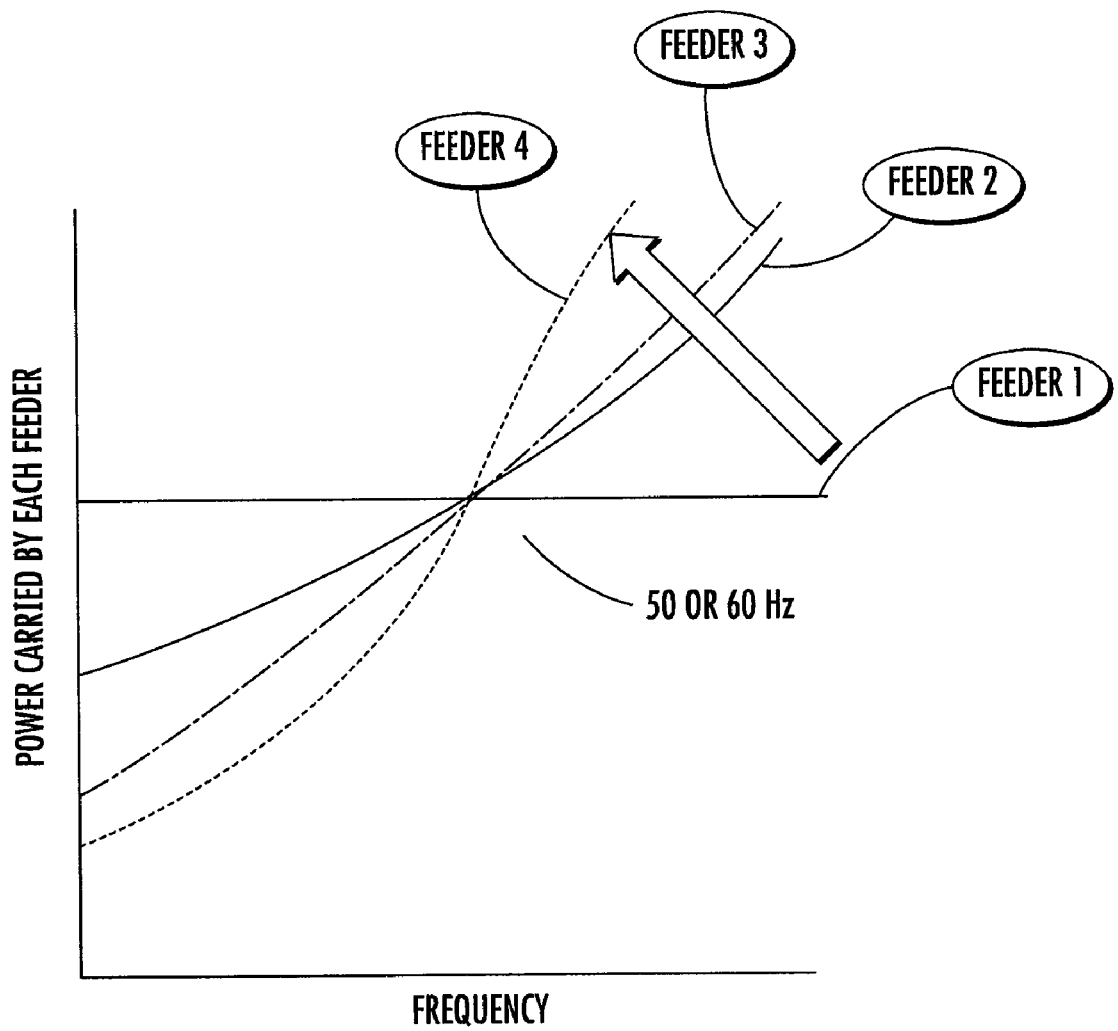
FIG. 6 shows how a sample of load frequency dependency for a feeder would react using the system of FIG. 1.

As shown in FIG. 6, feeders having different load characteristics are tripped in different orders. As shown, the priority of tripping will be from the less frequency dependent (flatter characteristics like feeder 1) to the most frequency dependent (as feeder 4). Tripping the less frequency dependent first is more advantageous than tripping the more frequency dependent load because the power carried is independent of the frequency drop and it establishes a balance between load and supply quicker.

Figure 7:
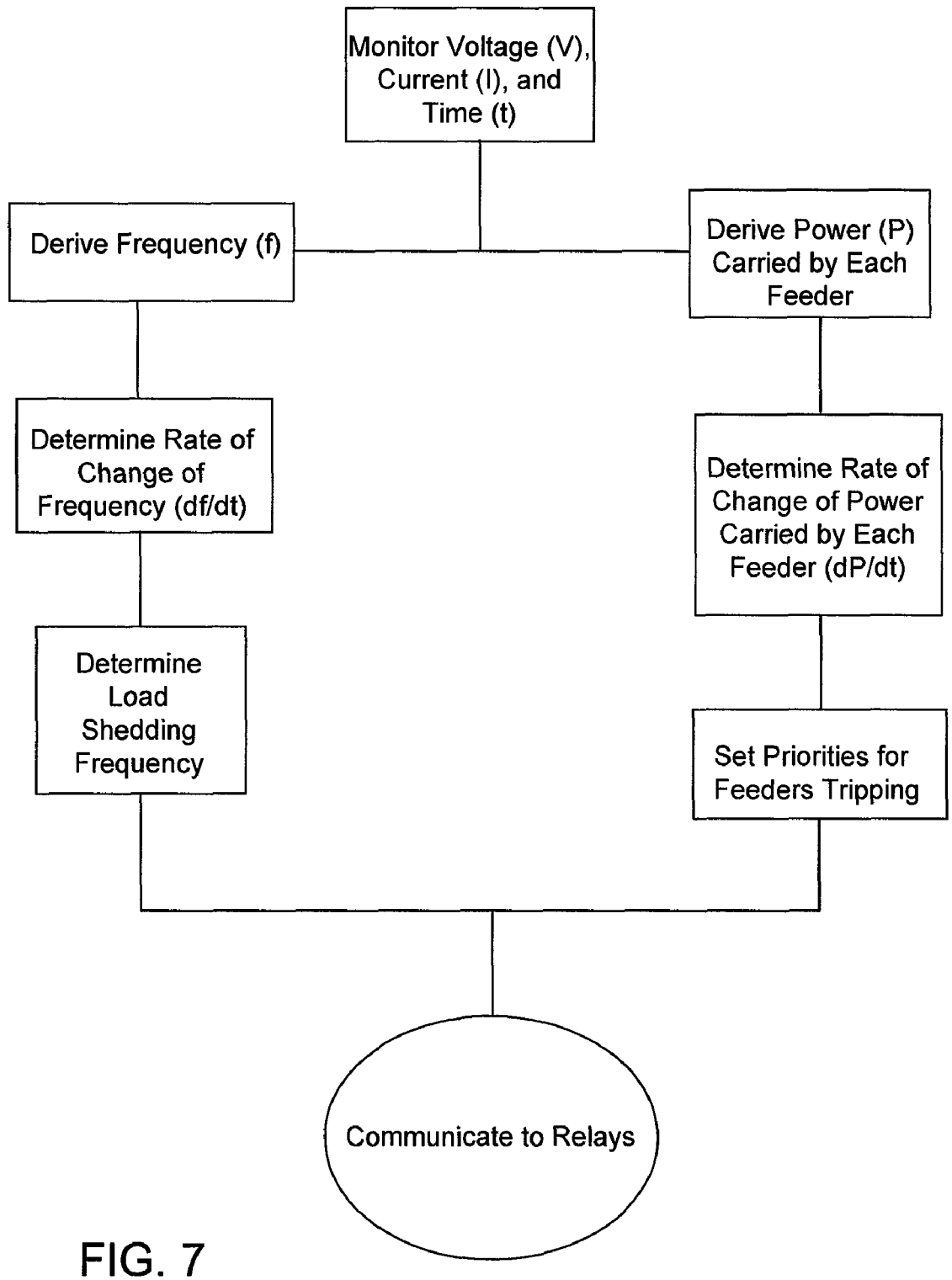
FIG. 7 shows a top level process for preempting a frequency decline using the system of FIG. 1.

In use, FIG. 7, voltage ("V") and current ("I") measurements, and time, ("t") are continuously monitored by a control system, computer, processor, or other suitable system or device. From the raw values of V and I, a frequency ("f") signal is derived. Time is established with a GPS device, while f can be derived based on zero crossing of the voltage signal, or other suitable method. From the measured V and I, magnitudes of the real power (P) carried by the different feeders are calculated.

Monitoring is done on a continuous basis; hence, the change in frequencies forms two measurements separated by a sampling interval; thus, yielding an estimate of the rate of change of frequency with time. This is also known as the first derivative of frequency with time (df/dt). Similarly, the rate of change of P with respect to frequency, or the first derivative of power with frequency (dP/df) may be derived from consecutive P and f measurements.

The value of df/dt provides an indication of the severity of the disturbance. The more negative in magnitude df/dt is, the more severe the disturbances. A positive df/dt indicates that the frequency decay is recovering. In the case of dP/df, a zero (0) value implies that the load is independent of frequency. A less negative value implies less dependence of frequency. A positive dP/df would indicate an increase of the load with the frequency; however, it is unlikely that this would occur.

From the df/dt values, the system 10 determines a new frequency load shedding point. This is based on the next predetermined (set point) load shedding value. The current df/dt alters the value at which the next load shedding event will take place, with more severe disturbances represented when df/dt is more negative than $K_{LS}$ and resulting in shedding load at higher frequencies. When df/dt is less negative than $K_{LS}$, then load shedding will take place at the predetermined load shedding frequency.

Similarly, dP/df is used to set the priority of the shedding of the different feeders based on the frequency dependency of the load they carry. This is determined by how negative the rate of change of power with frequency (dP/df) is for each feeder, with smaller values of dP/df having higher priority. This priority is then communicated as trip signals to different actual relays, and then to associated breakers.

The foregoing has described an emergency frequency load shedding scheme. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A load shedding system, comprising:
   (a) a signal generator adapted to generate a signal equal to a local system frequency;
   (b) a modifying circuit adapted to adjust a predetermined frequency based on a rate of change of the local system frequency and thereby generate an adjusted frequency; and
   (c) a processing circuit adapted to:
      (i) compare the adjusted frequency to the predetermined frequency; and
      (ii) set load shedding priorities for the local system based on the comparison of the adjusted frequency to the predetermined frequency.

2. The load shedding system according to claim 1, wherein the signal generator provides localized readings of frequency and power carried by the local system.

3. The load shedding system according to claim 1, wherein the signal generator generates a signal equal to a frequency measured at the local system.

4. The load shedding system according to claim 1, wherein the signal generator generates a signal equivalent to a power carried and measured at the local system.

5. The load shedding system according to claim 1, wherein the processing circuit includes a processor for setting the load shedding priorities.

6. The load shedding system according to claim 1, wherein the processing circuit compares data from the signal generator and the modifying circuit to predetermined frequencies.

7. The load shedding system according to claim 1, wherein the signal generator provides localized readings of frequency and power carried by feeders of the local system.

* * * * *